(12) United States Patent
Shams et al.

(10) Patent No.: US 9,355,269 B2
(45) Date of Patent: May 31, 2016

(54) METHOD AND SYSTEM FOR MANAGING UNIQUELY IDENTIFIABLE BOOKMARKLETS

(71) Applicants: Arian Shams, Laguna Beach, CA (US); Gaurav Shetti, Albany, CA (US); Jacob Portnoff, Albany, CA (US); Naeela Alkhalawi, Jeddah (SA)

(72) Inventors: Arian Shams, Laguna Beach, CA (US); Gaurav Shetti, Albany, CA (US); Jacob Portnoff, Albany, CA (US); Naeela Alkhalawi, Jeddah (SA)

( * ) Notice: Subject to any disclaimer, the term of this patent is extended or adjusted under 35 U.S.C. 154(b) by 105 days.

(21) Appl. No.: 14/270,691

(22) Filed: May 6, 2014

(65) Prior Publication Data

US 2015/0324598 A1    Nov. 12, 2015

(51) Int. Cl.
*G06F 17/00* (2006.01)
*G06F 21/62* (2013.01)
*G06F 17/30* (2006.01)
*H04L 29/08* (2006.01)
*G06F 17/22* (2006.01)

(52) U.S. Cl.
CPC ........ *G06F 21/6218* (2013.01); *G06F 17/2247* (2013.01); *G06F 17/30312* (2013.01); *G06F 17/30884* (2013.01); *G06F 17/30896* (2013.01); *H04L 67/02* (2013.01)

(58) Field of Classification Search
CPC ............ G06F 21/6218; G06F 17/2247; G06F 17/30312
See application file for complete search history.

(56) References Cited

U.S. PATENT DOCUMENTS

| | | | | |
|---|---|---|---|---|
| 8,407,576 | B1* | 3/2013 | Yin | G06F 3/0481 715/206 |
| 2007/0106627 | A1* | 5/2007 | Srivastava | G06Q 10/10 706/20 |
| 2007/0197229 | A1* | 8/2007 | Kalliola | G01S 3/46 455/456.1 |
| 2007/0206584 | A1* | 9/2007 | Fulling | G06Q 30/02 370/356 |
| 2008/0040674 | A1* | 2/2008 | Gupta | G06F 17/30884 715/745 |
| 2008/0154949 | A1* | 6/2008 | Brooks | G06F 17/30884 |
| 2009/0144264 | A1* | 6/2009 | Singh | G06F 17/30867 |
| 2009/0164564 | A1* | 6/2009 | Willis | G06F 17/30884 709/203 |
| 2010/0031133 | A1* | 2/2010 | Nastacio | G06Q 10/06 715/206 |
| 2010/0049766 | A1* | 2/2010 | Sweeney | G06F 17/30705 707/737 |
| 2011/0022528 | A1* | 1/2011 | Hennessy | G06Q 10/10 705/319 |
| 2012/0023084 | A1* | 1/2012 | Lalji | G06F 17/30864 707/706 |
| 2012/0023570 | A1* | 1/2012 | Gorodyansky | H04L 63/0407 726/12 |
| 2012/0240080 | A1* | 9/2012 | O'Malley | G06F 17/30876 715/810 |
| 2013/0107311 | A1* | 5/2013 | Eng | G06F 3/122 358/1.15 |
| 2013/0191723 | A1* | 7/2013 | Pappas | G06F 17/30917 715/234 |
| 2013/0311875 | A1* | 11/2013 | Pappas | G06F 17/2247 715/234 |

* cited by examiner

*Primary Examiner* — Marshon Robinson (57) ABSTRACT

A method and system for collecting data contained within web resources in a uniquely identifiable bookmarklet system wherein the uniquely identifiable bookmarklet system includes uniquely generated bookmarklets that execute an unobtrusive script within the document object model of a currently loaded Web Page in a Web Browser program, whereby the script sends a request containing an identifying marker associated with the bookmarklet. The request containing the identifying marker is authenticated and authorized in order to allow one or more users executing the bookmarklet to submit data extracted from the document object model of a currently loaded Web Page to one or more data collections associated with the bookmarklet.

4 Claims, 5 Drawing Sheets

METHOD AND SYSTEM FOR MANAGING UNIQUELY IDENTIFIABLE BOOKMARKLETS

CROSS-REFERENCE TO RELATED APPLICATIONS

This application claims the benefit of Provisional Patent Application U.S. 61/822,428 with a filing date of May 12, 2013.

FIELD OF THE INVENTION

The present invention relates generally to collection of internet data. More particularly, the present invention relates to using bookmarklets to transfer data to repositories. More particularly, the present invention relates to a method and system for managing a uniquely identifiable bookmarklet system.

BACKGROUND OF THE INVENTION

As generally known in the context of the Internet and Web Browser programs, "bookmarks" refer to locally stored URL ("Uniform Resource Locator") pointers that primarily have been used by users to catalog Web pages they have visited or plan to visit. Users can click on a bookmark to have the Web Browser program navigate to the Web page identified in the URL of the bookmark.

More recently, new technologies commonly known as "bookmarklets" have been introduced. A bookmarklet is similar to a bookmark except that the URL stored in a bookmarklet contains an unobtrusive script (usually JavaScript program) which usually causes the Web Browser program to perform some function as opposed to having the Web Browser program navigate the user to a Web page. Bookmarklets can perform a wide variety of functions, some of which can include extracting data from or appending HTML ("HyperText Markup Language") elements to the DOM ("Document Object Model") of a currently loaded Web page in the Web Browser program. Additionally bookmarklets can be used to send data to and/or receive data from Web services.

More recently, users have used bookmarklets to either individually or collaboratively save data extracted from the DOM of a Web page (i.e. text, images, URLs, etc.) to collections within a central repository (i.e. database) provided by a web service. Furthermore, users can attach custom data to the data extracted by the bookmarklet prior to saving it to the collection, such as is commonly performed in social bookmarking systems whereby users add tags to bookmarks containing URLs extracted by a bookmarklet. A collection can be thought of as a specific grouping of data within a repository. For example, a collection within a repository can be represented as digital photo albums within a repository of digital photo albums provided by a web service whereby each album is comprised of select digital photos that the user selects to be included in the album.

A shortcoming of bookmarklets used by web services as a means for users to submit data to collections within centralized repositories, such as some social bookmarking systems, is that the bookmarklets are not differentiable or uniquely identifiable by the web service and usually execute a user agnostic JavaScript program, whereby requiring the user to log in to the Web service to submit data to the appropriate collection associated with the users account, which is determined by the web service after the user is authenticated, authorized and a session is established. Additionally, the user may need to create an account with the web service in order to log in while using the bookmarklet to submit data to the collection. The aforementioned Web services use the users' account information to appropriately direct the data to the correct collection and, optionally, control what type and how much data a user is authorized to submit to a collection or repository as a whole.

It is an object of this invention to provide a means by which a Web service can provide uniquely identifiable bookmarklets whereby each uniquely identifiable bookmarklet is attributed to specific collections within an information repository and the administrative users of those collections can control how each bookmarklet can be used to submit data to those collections by other users without requiring those other users to create user accounts with the web service.

SUMMARY OF THE INVENTION

According to one embodiment of the present invention, a uniquely identifiable bookmarklet system is provided wherein the uniquely identifiable bookmarklet system includes information repositories composed of collections whereby a method of generating uniquely identifiable bookmarklets associated with specific collections permits an assigned administrative user of the specific collections to generate and distribute each uniquely identifiable bookmarklet to users (herein referred to as "contributing users") whereby a method of authenticating and authorizing each uniquely identifiable bookmarklet permits contributing users to use the bookmarklets to submit data to the collections associated with the uniquely identifiable bookmarklet.

In a further aspect of the method, the step of authenticating each uniquely identifiable bookmarklet includes associating with each bookmarklet a uniquely identifiable and sufficiently large single or set of numbers or character strings ensuring practical uniqueness whereby that identifying numbers or character strings (herein referred to as the bookmarklets' "Identifying Marker") is supplied by each bookmarklet to a bookmarklet processor, wherein the processor is operative to verifying the bookmarklets' existence and its associated collections within the uniquely identifiable bookmarklet system.

In yet another aspect of the method, the step of authorizing each uniquely identifiable bookmarklet includes the said bookmarklet processor enforcing a list of authorization controls after a bookmarklet has been authenticated whereby each authorization control affects the capabilities of the bookmarklet, wherein the assigned administrative user of the specific collections is permitted to associate said authorization controls to each uniquely identifiable bookmarklet associated with the specific collections.

Additional features and advantages are realized through the techniques of the present invention. Other embodiments and aspects of the invention are described in detail herein and are considered a part of the claimed invention.

BRIEF DESCRIPTIONS OF THE DRAWINGS

The present invention will be more fully understood and appreciated by reading the following Detailed Description in conjunction with the accompanying drawings, in which.

DETAILED DESCRIPTION OF THE INVENTION

Embodiments of systems and methods involving the management of a uniquely identifiable bookmarklet system are provided herein.

Figure 1:
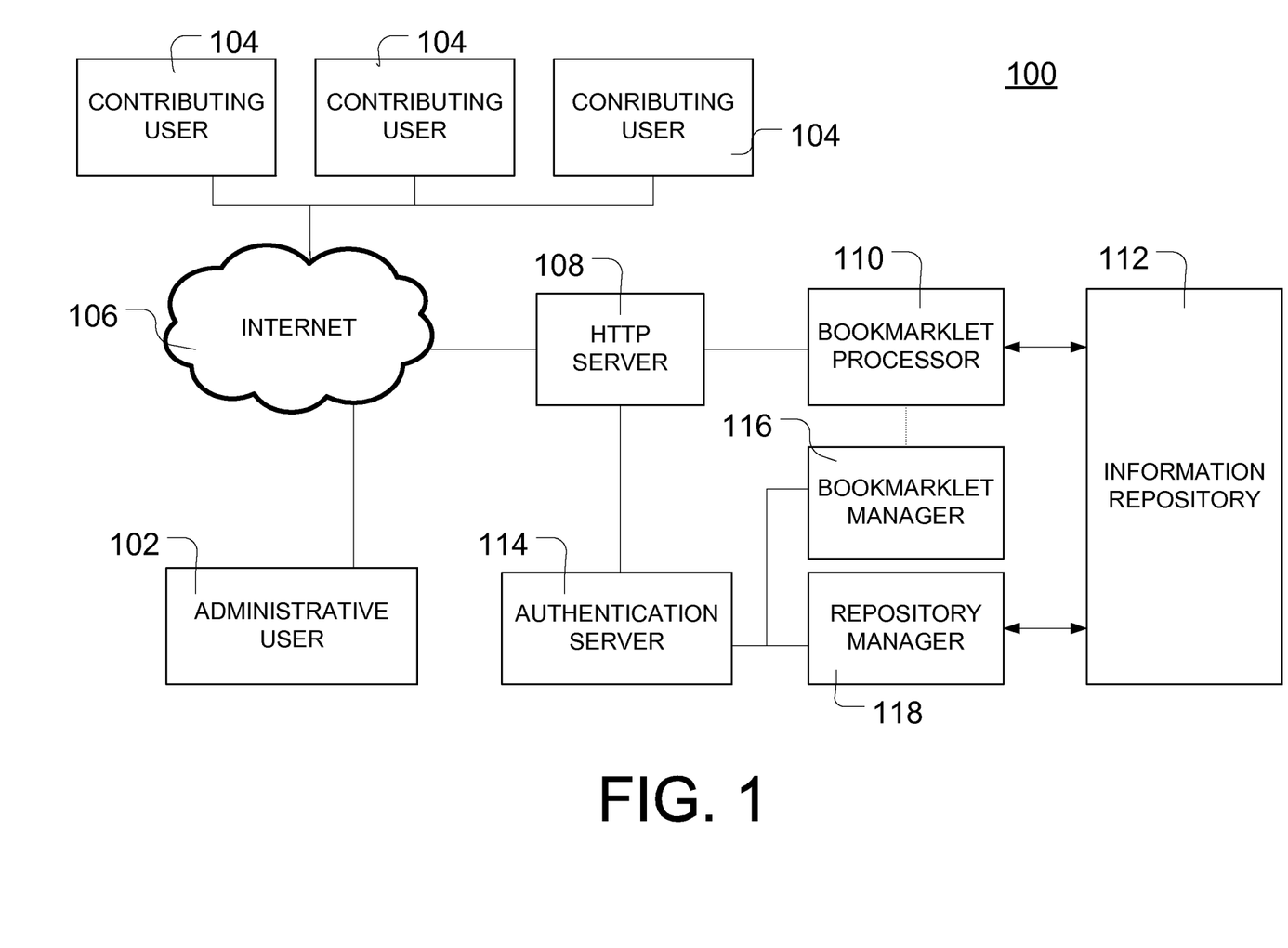
FIG. 1 shows a schematic diagram of an embodiment of a system of the invention.

FIG. 1 shows a schematic diagram of an embodiment of a uniquely identifiable bookmarklet system 100. System 100 is operated in a way where an administrative user 102 would like to provide a means for a contributing user 104 to submit data to an information repository 112 through a communication channel composed of the internet 106 and an HTTP server 108 by providing the contributing user 104 with a uniquely identifiable bookmarklet (herein referred to as "bookmarklet") wherein the bookmarklet itself can be uniquely identified by a bookmarklet processor 110. The bookmarklet processor 110 is capable of identifying each bookmarklet, and, within the context of each bookmarklet, is capable of sending and receiving data and resources to and from the contributing users 104 Web Browser program that is running the bookmarklet program, enforcing authorization controls established for the bookmarklet by the administrative user 102 through the bookmarklet manager 116, processing data submitted by the contributing user 104 through the bookmarklet program, and saving the data to the specific collections within the information repository 112 assigned to the bookmarklet by the administrative user 102. The data submitted by each bookmarklet program is processed by the bookmarklet processor 110 prior to being stored in the collection assigned to the bookmarklet within the information repository 112. Aforementioned, a collection can be thought of as a specific grouping of data within an information repository 112. An example of a collection includes, but is not limited to, a digital photo album comprised of select digital photos within an information repository (i.e. database) provided by a web service that allows users to create albums and select which photos to include in each album.

It should be mentioned that it is preferable, but not necessary, for the communication channel between the contributing user 104 and the HTTP server 108 or the administrative user 102 and the HTTP server 108 be secured through Secure Socket Layer (SSL) encryption wherein the data communicated between the entities is reasonably protected from eavesdropping and tampering by other internet users.

It should further be mentioned that an administrative user 102 can also act as a contributing user 104 whereby the administrative user 102 can use a bookmarklet that they manage.

The administrative user 102 can gain access to a bookmarklet manager 116 and repository manager 118 of the system 100 by authenticating their identity through an authentication server 114. Examples of authentication servers include, but are not limited to enterprise single-sign on solutions such as Microsoft ActiveDirectory, and the HTTP basic authentication method implemented by most HTTP servers. After gaining access to the system 100, the administrative user 102 can create collections within the information repository 112 of the system 100 through the repository manager 118. The administrative user 102 is then able to generate a plurality of uniquely identifiable bookmarklets in the bookmarklet manager 116 and assign the bookmarklets to one or more of the collections. Additionally, the administrative user 102 is able to assign any number of authorization controls to each bookmarklet, which is enforceable by the bookmarklet processor 110 when a contributing user 104 attempts to use the bookmarklet wherein the bookmarklet, or any subsequently loaded resource appended to the DOM of the currently loaded Web page in the contributing users 104 Web Browser program as a result of the bookmarklet being invoked, communicates with the bookmarklet processor 110. Authorization controls are rules that affect the capabilities of each bookmarklet. An example of an authorization control can include, but is not limited to, restricting the number of submissions a bookmarklet is permitted to make to its assigned collection within the information repository 112. In yet another example, an authorization control can include a bookmarklet expiration date whereby requests made to the bookmarklet processor 110 by the bookmarklet program after the said expiration date is no longer authorized. In yet another example, a bookmarklet invoked in a currently loaded Web page on the contributing users 104 Web Browser program can send information regarding the domain of the currently loaded Web page to the bookmarklet processor 110 and, therefore suggesting, an authorization control can be applied to limit submissions of data to data received by bookmarklets invoked on a contributing users 104 currently loaded Web Page whereby the said Web Pages domain is included in a defined set of permitted domains. In yet another example, an authorization control may state a rule wherein the contributing user 104 be required to submit additional data, such as a password, to authorize the submission of the data to the collection within the information repository 112. In yet another example, an authorization control may state a rule wherein the contributing user 104 be required to select a specific subset of the collections assigned to the bookmarklet for which to submit the data. The number of possible authorization controls is vast and may include any rule based on information and data available to the bookmarklet processor 110, which may include, but is not limited to, data accessible by the bookmarklet or any subsequently appended resources to the DOM of the currently loaded Web page on the contributing users 104 Web Browser program as a result of the bookmarklet being invoked whereby the bookmarklet or the said subsequently loaded resources is able to send such data to the bookmarklet processor 110 in conjunction with the data to be saved to the collection within the information repository 112.

It should be mentioned that authentication of the administrative user 102 by the authentication server 114 is a preferable, but not necessary component of the system 100.

The administrative user 102 is additionally able to distribute the bookmarklets to contributing users 104. An example of the means by which the administrative user 102 can distribute the bookmarklets includes, but is not limited to, having the Web service implementing the said system 100 to generate a Web page with a unique URL containing the bookmarklet within it, whereby the contributing users 104 can visit the Web page from their Web Browser program and obtain and install the bookmarklet.

It should be mentioned that the components in system 100 can be implemented by a single instance of an application or through multiple installations of one or more applications. Components can be installed on any number of physical or virtual servers or collocated on a single physical or virtual server or any combination of the said options.

Figure 2:
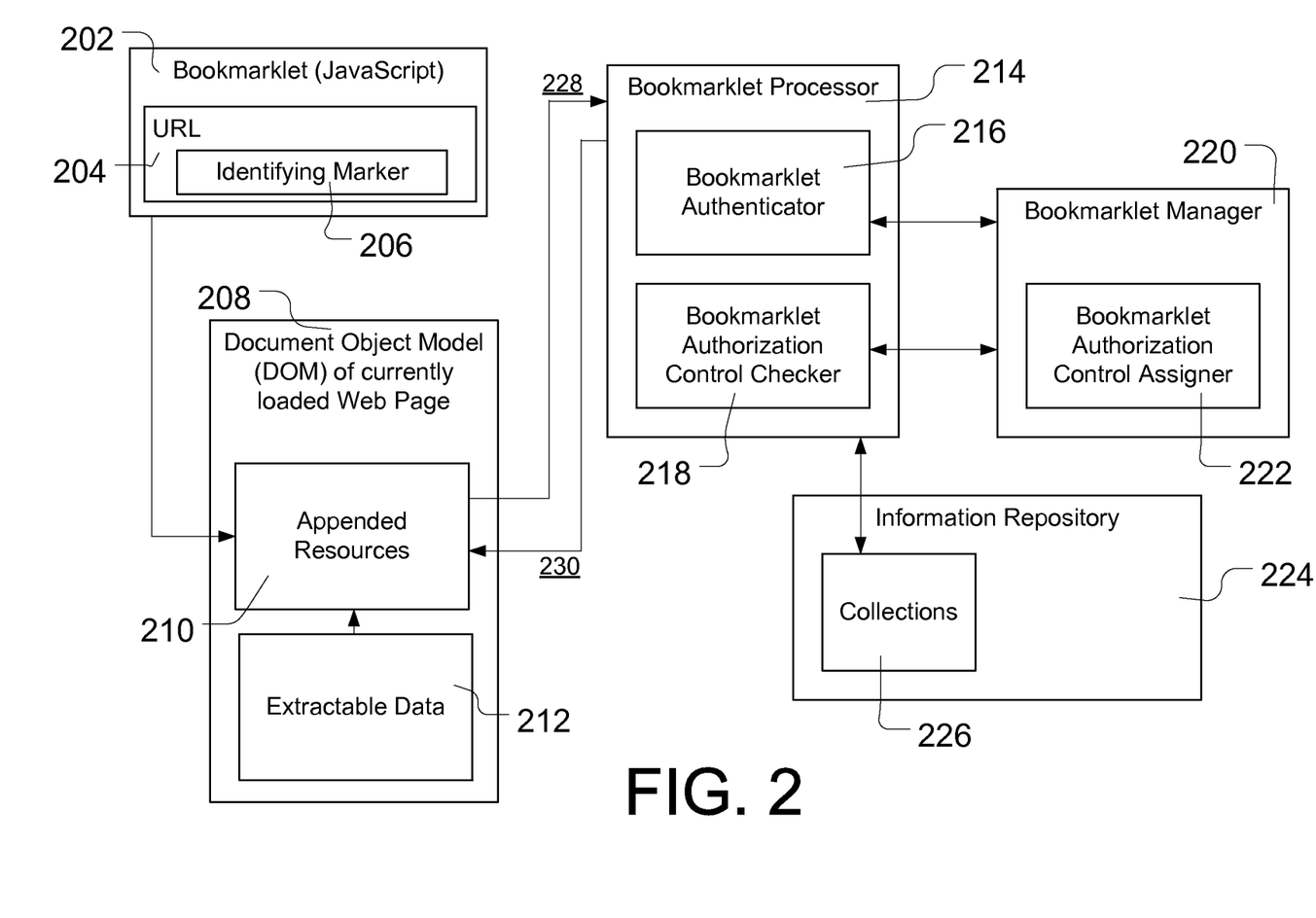
FIG. 2 shows a block diagram showing components in an illustrative embodiment of the disclosed system.

FIG. 2 is a block diagram showing components in an illustrative embodiment of the disclosed system. As shown in FIG. 2, a uniquely identifiable bookmarklet 202 contains a URL 204, which is an unobtrusive script (usually JavaScript program) that executes within the DOM 208 of a currently loaded Web page on a contributing users 104 Web Browser program. The DOM 208 may contain extractable data 212 for which the contributing user 104 may want to extract and submit to the collections 226 assigned to the bookmarklet 202 within the information repository 224 (also referenced to in 112 of FIG. 1).

The unobtrusive script contained in the URL 204 of the bookmarklet 202 contains an identifying marker 206 which is used to authenticate the bookmarklet 202 by the bookmarklet authenticator 216 within the bookmarklet processor 214 (also referenced to in 110 of FIG. 1). As aforementioned, a bookmarklets identifying marker 206 is a uniquely identifiable and sufficiently large single or set of numbers or character strings ensuring practical uniqueness within the system 100. The bookmarklet manager 220 (also referenced to in 116 of FIG. 1) maintains a repository of the identifying markers 206 wherein those identifying markers 206 are used to uniquely identify each bookmarklet 202.

Once invoked, the bookmarklet 202 executes the URL 204 script within the context of the DOM 208 in the contributing users 104 Web Browser program. The bookmarklet 202 is capable of appending HTML elements to the DOM whereby some appended HTML elements are able to make HTTP requests for additional resources. HTML elements appended by the bookmarklet 202 to the DOM 208 can include, but are not limited to, "<script>" elements or "<iframe>" elements containing "src" attributes with URLs pointing to the respective locations of the JavaScript library or the HTML document, wherein after appended to the DOM 208 can subsequently make HTTP requests to obtain the respective resource indicated in their respective "src" URL. The total of all the elements appended to the DOM 208 by the bookmarklet 202 in addition to all the resources loaded by the appended HTML elements thereafter are collectively referred to as "appended resources" 210. The appended resources 210 serve to aid the contributing user 104 to extract data 212 from the DOM 208, edit the extracted data 212, and/or enter custom data to be submitted to the collections 226.

It should be mentioned that appended resources 210 may execute their own functions and methods within the context of the DOM 208. For the purposes of the description of this invention, the functions and methods executed by both the appended resources 210 and the bookmarklet 202 will collectively be referred to as the "bookmarklet program."

When an appended resource 210 makes an HTTP request to the bookmarklet processor 214, a variable containing the identifying marker 206 can be submitted as part of the HTTP request packet 228. The identifying marker 206 can be submitted as part of a POST variable whereby the variable is embedded within the body of the HTTP request packet 228, as part of a GET variable whereby the variable is embedded within the URL query string of the HTTP request packet 228, or as part of the URL itself whereby the bookmarklet processor 214 can read the appropriate section of the URL to obtain the identifying marker 206. It should be mentioned that there may be other means of including the identifying marker 206 in the HTTP request packet 228, which may include, but is not limited to, the HTTP request packet 228 header variables. The bookmarklet processor 214 can read the identifying marker 206 of the bookmarklet 202 within the HTTP request packet 228. The bookmarklet authenticator 216 can then perform a lookup to verify the existence of the bookmarklet 202 within the system 100 and determine whether the bookmarklet 202 is authentic. It should be mentioned that additional data, available either within the HTTP request packet 228 or available to the bookmarklet authenticator 216 by other sources, can be used in conjunction with or in lieu of the identifying marker 206 by the bookmarklet authenticator 216 to authenticate the bookmarklet 202 if so desired. Further, if the bookmarklet 202 is determined to be authentic by the bookmarklet authenticator 216, the bookmarklet authorization control checker 218 then performs a check against the authorization controls applied to the bookmarklet 202 by retrieving a list of the authorization controls from the bookmarklet authorization control assigner 222 within the bookmarklet manager 220. After the bookmarklet 202 has been authenticated and authorized against its assigned authorization controls, a resource is prepared and customized based on the rules of the assigned authorization controls. It should be mentioned that the prepared resource may contain a copy of the identifying marker 206 within the context of the resource. An example includes, but is not limited to, returning a JavaScript library resource wherein the library contains a JavaScript variable that is assigned a value equal to the identifying marker 206. Once prepared, the resource is returned to the bookmarklet program by the bookmarklet processor 214 in the form of an HTTP response packet 230. It should be mentioned that the resources returned by the bookmarklet processor 214 are subject to customization based on additional data submitted by the bookmarklet program. It should additionally be mentioned that a bookmarklet program may pass additional data in conjunction with the identifying marker 206 to have the bookmarklet processor 214 perform additional processing other than or in addition to returning an HTTP response packet 230.

An example whereby the identifying marker 206 of the bookmarklet 202 may be submitted to the bookmarklet processor 214 can include, but is not limited to, an operation wherein the bookmarklet 202 appends an iframe HTML element to the DOM 208, whereby the "src" attribute contains a URL that points to the bookmarklet processor 214 and includes a GET variable containing the identifying marker 206 in the form of a query string within the URL of the iframe "src." Further in the example, the bookmarklet processor 214 receives the HTTP request packet 228 for resources from the said iframe element, obtains the identifying marker 206 from the query string of the HTTP request packet 228, authenticates the bookmarklet 202 through the bookmarklet authenticator 216, checks the bookmarklet against all its authorization controls through the bookmarklet authorization control checker 218, and then builds the resource to be returned in the form of an HTML document for insertion into the iframe, which is returned to the bookmarklet program in an HTTP response packet 230. Further in the example, the said HTML document that was built by the bookmarklet processor 214 can contain data within it whereby that data includes a copy of the identifying marker 206 wherein methods and functions within the said HTML document of the iframe are able to submit subsequence HTTP request packets 228 that contain the identifying marker 206 and potentially additional data to the bookmarklet processor 214 in order for the request to be authenticated, authorized and appropriately handled by the bookmarklet processor 214 wherein the bookmarklet processor 214 returns a resource to the bookmarklet program and/or saves the submitted data to the collections 226.

It should be mentioned that one example of submitting GET or POST variables through HTTP request packets is through the use of Asynchronous JavaScript and XML (AJAX) whereby HTTP request packets are made programmatically through JavaScript in the bookmarklet program.

It should further be mentioned that an operation performed by the bookmarklet program may be to request resources from services other than the bookmarklet processor 214. In such circumstances, it may not be necessary for the bookmarklet program to include the identifying marker 206 within the HTTP request packet to the said services.

It should further be mentioned that the URL 204 script within the bookmarklet 202 may submit HTTP request packets which include the identifying marker 206 to the boomarklet processor 214 directly through the methods and functions defined in the script itself without the need to append any HTML elements to the DOM 208.

The administrative user 102 is able to gain access to the bookmarklet manager 220 after being authenticated through the authentication server 114 whereby the administrative user 102 is able to generate bookmarklets 202 assigned to collections 226 within the information repository 224. Further, the administrative user 102 can assign zero or more authorization controls to the said generated bookmarklets 202 using the bookmarklet authorization control assigner 222. A variety of additional operations can be made available to the administrative user 102 to manage the generated bookmarklets 202. Some of the said operations can include, but are not limited to, disabling or deleting individual bookmarklets 202, reassigning bookmarklets 202 to different or additional collections 226, or distributing bookmarklets 202 to contributing users, wherein an example of a distribution operation can include, but is not limited to, sending an email to a contributing user 104 whereby the email contains a link to a Web page containing the bookmarklet 202.

It should be mentioned that the bookmarklet authorization control assigner 222 and the bookmarklet authorization control checker 218 are optional components of the system 100 and it is possible to forego implementations of the said components if authorization controls for bookmarklets 202 are not a desired functionality of the system 100.

Figure 3:
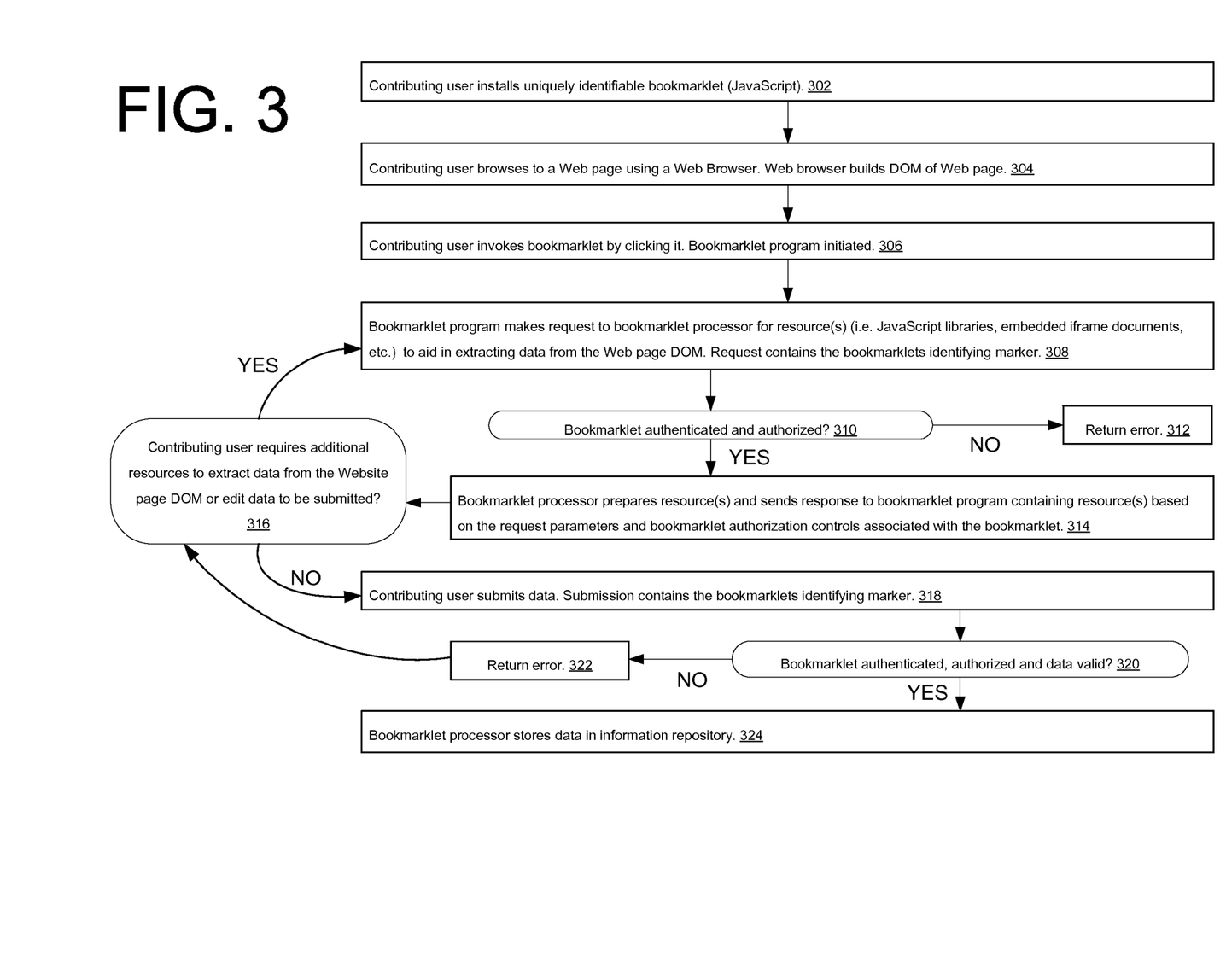
FIG. 3 shows a flowchart of a method according to the present invention.

FIG. 3 is a flow chart showing steps performed during the operation of an illustrative embodiment of the disclosed system. As shown in FIG. 3, at step 302, a contributing user 104 installs onto their Web Browser program a uniquely identifiable bookmarklet 202 that has been generated by an administrative user 102 for a collection 226 within an information repository 224. At step 304, the contributing user 104 browses to a Web page whereby the contributing users 104 Web Browser program builds the Document Object Model ("DOM") 208 of the Web page. At step 306, the contributing user 104 invokes the bookmarklet 202 by clicking it or through other available means. Once invoked, the bookmarklet 202 executes an unobtrusive script within the context of the DOM 208 of the currently loaded Web Page, thereby initializing the bookmarklet program as previously defined.

At step 308, one of the operations that may be performed by the bookmarklet program is to append HTML elements to the DOM 208, which could subsequently make an HTTP request packet 228 to the bookmarklet processor 214 for additional resources (i.e. JavaScript libraries, HTML documents embeddable in iframes, pictures, forms, additional HTML elements, etc.) to aid the contributing user 104 to extract data from the DOM 208, edit extracted data from the DOM 208, and/or enter custom data to be submitted to the collection 226. It should be mentioned that an operation performed by the bookmarklet program may be to request resources from services other than the bookmarklet processor 214. Further at step 308, when a request is made to the bookmarklet processor 214 for resources, a variable containing the bookmarklets identifying marker 206 can be submitted as part of the HTTP request packet 228 to the bookmarklet processor 214.

At step 310, the bookmarklet processor 214 reads the identifying marker 206 of the bookmarklet 202 within the HTTP request packet 228 and performs a lookup to verify the existence of the bookmarklet 202 within the system 100 and a determination of whether that bookmarklet 202 is authentic is made. Further, if the bookmarklet 202 is determined to be authentic, the bookmarklet authorization control checker 218 performs a check against the authorization controls assigned to the bookmarklet 202 and makes a determination of whether the bookmarklet 202 is authorized within the context of the type of request. If the bookmarklet 202 is determined as not authentic and/or not authorized, then the process flow proceeds to step 312 whereby an error is returned to the bookmarklet program. If the bookmarklet is determined as authentic and authorized, then the process flow proceeds to step 314 whereby the bookmarklet processor 214 prepares the requested resources to be returned to the bookmarklet program. It should be mentioned that the resources returned to the bookmarklet program are subject to customization based on data submitted by the bookmarklet program and/or applicable authorization controls that customize resources returned to the bookmarklet program. It should additionally be mentioned that a bookmarklet program may pass additional data in conjunction with the identifying marker 206 to have the bookmarklet processor 214 perform additional processing.

After a resource is returned to the bookmarklet program at step 314, the process flow proceeds to step 316 whereby there could be two possible states. In the first state, the contributing user 104 does not yet have the sufficient resources (i.e. JavaScript libraries, HTML elements such as iframes or forms) in order to submit the appropriate data to the collections 226 within the information repository 224. In such a state, the contributing user 104 can make additional requests for resources, of which can include requests for resources from the bookmarklet processor 214 whereby the process flow would retrace steps 308, 310, possibly 312 and possibly 314 and return back to step 316. In the second state, the contributing user 104 has sufficient resources to extract data from the DOM 208 of the currently loaded Web page, edit the extracted data and/or enter custom data. In such a state, the process flow proceeds to step 318 whereby the contributing user 104 submits the data in conjunction with the identifying marker 206 to the bookmarklet processor 214 to be entered into the collections 226.

At step 320, the bookmarklet processor 214 reads the identifying marker 206 of the bookmarklet 202 within the HTTP request packet 228 and performs a similar authentication and authorization check as performed in step 310. Additionally, the bookmarklet processor 214 validates any data submitted in the HTTP request packet 228, whereby there may include certain validation rules defined by authorization controls assigned to the bookmarklet 202. If the bookmarklet 202 is found to be authentic, authorized and the data is valid, then the process flow proceeds to step 324 whereby the data submitted is saved to the collections 226 within the information repository 224 that is associated with the bookmarklet 202. Optionally, the bookmarklet processor 214 may return data to the contributing user 104 indicating a successful or unsuccessful save of the data to the collection 226, which is not depicted in FIG. 3. If the bookmarklet 202 is not authenticated, not authorized or the submitted data is found to be invalid, the process flow would proceed to step 322 whereby an error is return to the bookmarklet program wherein the contributing user 104 would need to return to step 316 and proceed through the process flow from that step to accomplish their goal to get to step 324.

It should be mentioned that at step 308, it may not be necessary for certain requests for resources to the bookmarklet processor 214 to contain the identifying marker 206 of the bookmarklet if an authentication check of the bookmarklet 202 is not desired.

It should further be mentioned that when the bookmarklet program is initiated at step 306, the contributing user 104 may be ready to submit data to the bookmarklet processor 214 to save to the collections 226 within the information repository 224 without needing to make requests for additional resources from the bookmarklet processor 214. In such circumstances, step 306 would lead directly to step 318.

Figure 4:
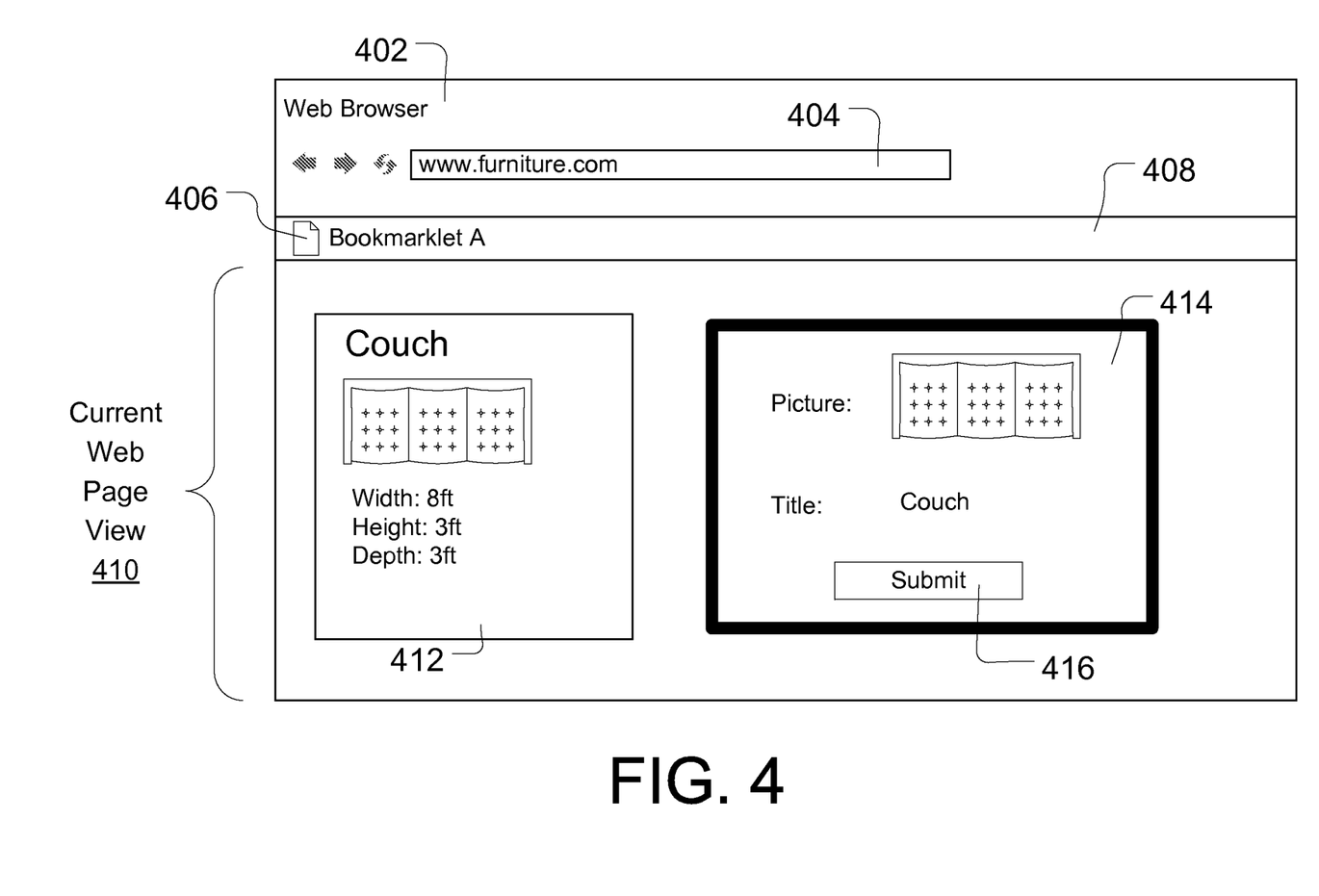
FIG. 4 shows an example of a user interface provided to the contributing user that enables the contributing user to extract data exposed through the Web page and submit the data to an information repository, as provided by an illustrative embodiment of the disclosed system.

FIG. 4 shows an example of a user interface provided to the contributing user 104 that enables the contributing user 104 to extract data within the currently loaded Web page and submit the data to the collections 226 within the information repository 224. It should be mentioned that the example illustrated in FIG. 4 is one example of many possible illustrative embodiments of the system 100. As shown in FIG. 4, the Web Browser 402 in the contributing users 104 client computer has loaded the DOM 208 of a currently loaded Web page identified by its URL in the Web Browsers location bar 404. Additionally the contributing user 104 has installed a uniquely identifiable bookmarklet 406 (also referenced to in 202 of FIG. 2) in the Web Browsers bookmarks bar 408 (sometimes generally referenced to as "Favorites" or "Favorites Menu").

The DOM 208 of the currently loaded Web page includes extractable data 412 (also referenced to in 212 of FIG. 2) for which the contributing user 104 may want to submit to the collections 226. It should be mentioned that extractable data 212 is not limited to HTML elements displayed on the current Web page view 410. Extractable data 212 includes any data that is accessible by the bookmarklet program. Examples of extractable data 212 include, but are not limited to, the DOM elements available to the bookmarklet program and any data contained within cookies stored by the Web Browser 402 that are accessible by the bookmarklet program, which may include iframe HTML elements that have been appended to the DOM 208.

As illustrated in FIG. 4, an example sequence of operations that may be performed includes the contributing user 104 clicking on the bookmarklet 406 wherein the bookmarklet program appends an iframe element 414 to the DOM 208 whereby the iframe element 414 contains a "src" attribute with a URL that points to the bookmarklet processor 214. The iframe "src" URL additionally includes a query string with the bookmarklets identifying marker 206 and a variable containing the URL of the currently loaded Web page as shown in the Web Browsers location bar 404 that has been extracted by the bookmarklet program. The iframe element 414 sends an HTTP request packet 228 to the bookmarklet processor 214 with the said iframe "src" URL wherein the bookmarklet processor 214 authenticates and authorizes the bookmarkelet 406. Further in the example, the bookmarklet processor 214 reads the URL of the currently loaded Web page from the query string of the HTTP request packet 228, makes a separate HTTP request to the said URL, reads the returned HTML document, performs an analysis to extract data from the HTML document, builds a new HTML document containing the extracted data to be inserted into the iframe element 414, and returns the new HTML document to the bookmarklet program to insert into the iframe element 414. It should be mentioned that in the aforementioned example, the bookmarklet processor 214 made its own HTTP request using the URL of the currently loaded Web page that was submitted to it and subsequently processed the returned HTML document to extract data. Another possible implementation of the aforementioned example may include the bookmarklet program appending a script element to the DOM 208 whereby the subsequent JavaScript library loaded into the script element analyzes the DOM 208 that is in the currently loaded Web page in the Web Browser 402 and then submits the extracted data to the bookmarklet processor 214 in the form of variables appended to the query string of the iframe "src" URL. It should be mentioned that in the aforementioned example, the HTML document inserted into the iframe element 414 that was returned by the bookmarklet processor 214 contains the bookmarklets identifying marker 206 within its functions and methods.

After the HTML document is loaded into the iframe element 414, the contributing user 104 can then submit the data by clicking on the submit button 416, which is within the HTML document of the iframe element 414. After clicking on the submit button 416, an HTTP request packet 228 is sent to the bookmarklet processor 214 by the functions and methods within the iframe element 414, wherein the HTTP request packet 228 includes the data to be submitted to the collections 226 and the bookmarklets identifying marker 206. The bookmarklet processor 214 then authorizes and authenticates the bookmarklet 406 and then saves the valid data to the collections 226 within the information repository 224.

Figure 5:
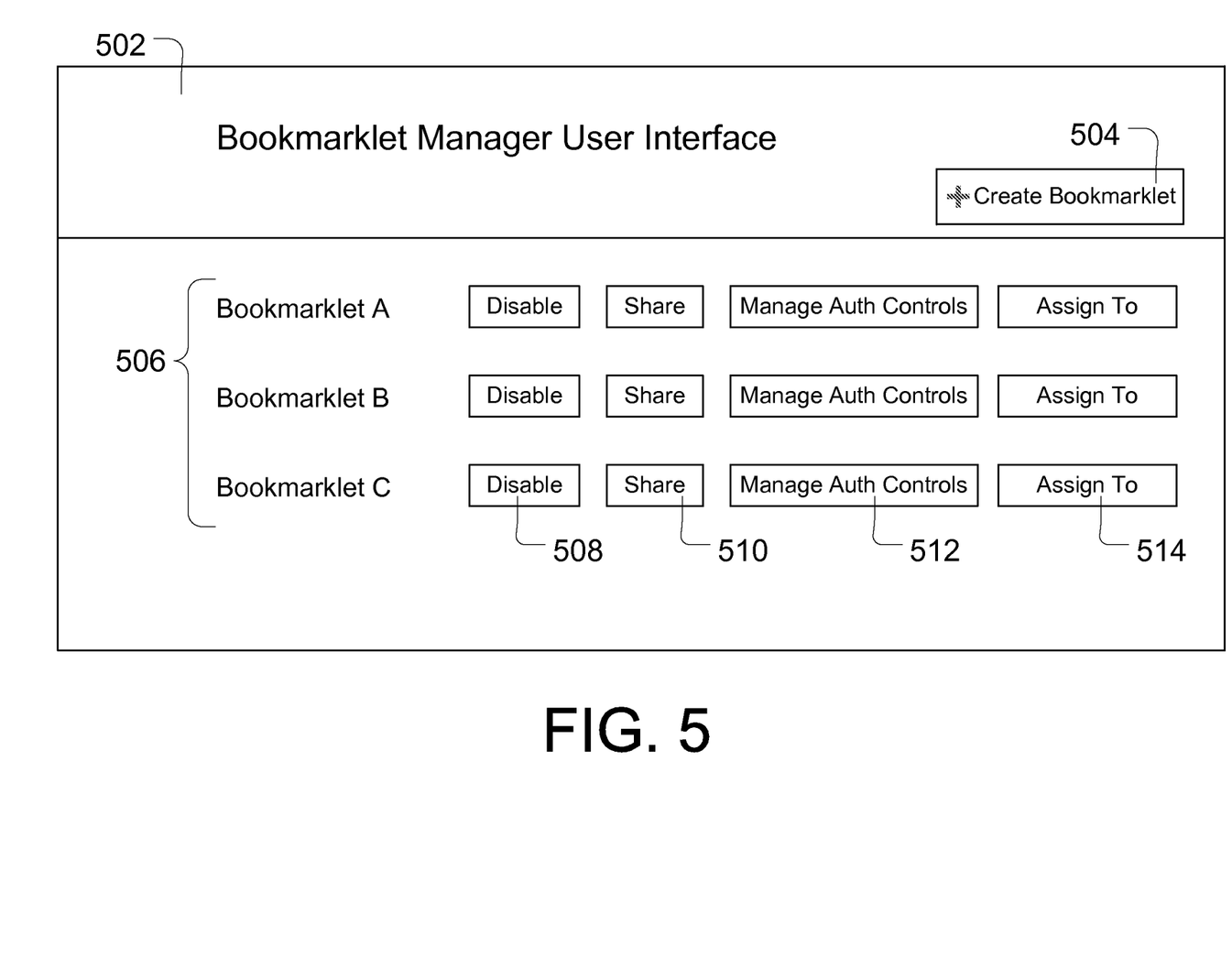
FIG. 5 shows an example of a user interface provided to the administrative user that enables the administrative user to manage a list of uniquely identifiable bookmarklets, as provided by an illustrative embodiment of the disclosed system.

FIG. 5 shows an example of a user interface 502 provided to an administrative user 102 as a means to access the bookmarklet manager 220 whereby the administrative user 102 is able to manage bookmarklets 202. It should be mentioned that the user interface 502 illustrated in FIG. 5 is one example of many possible illustrative embodiments of a possible user interface that may be used by administrative users 102 to manage bookmarklets 202. It should further be mentioned that FIG. 5 illustrates a few of the potentially many managerial functions that may be performed on each bookmarklet 202. The presented system 100 is not limited to the managerial functions illustrated in FIG. 5.

As shown in FIG. 5, the user interface 502 includes a create button 504 whereby the administrative user 102 is able to generate new bookmarklets 202, each with a unique identifying marker 206, whereby each newly generated bookmarklet 202 is added to the list of available bookmarklets 506. For each bookmarklet 202, the administrative user 102 is able to perform a variety of managerial functions. One example can include disabling 508 the bookmarklet 202 whereby, if selected, would cause any HTTP request packets 228 sent from the bookmarklet program of the respective bookmarklet 202 to the bookmarklet processor 214 to fail an authentication check performed by the bookmarklet authenticator 216. Another example can include an option to share 510 a bookmarklet 202 whereby the administrative user 102 can distribute the bookmarklet 202 to contributing users 104. One example of sharing 510 includes, but is not limited to, sending an email to a contributing user 104 whereby the email contains a link to a custom Web page, which contains the bookmarklet 202 within it. Yet another example can include an option to manage the authorization controls 512 of each bookmarklet whereby zero or more authorization controls can be assigned to the bookmarklet 202. Yet another example can include an option to assign bookmarklets to collections 514 whereby the data submitted to the bookmarklet processor 214 by the bookmarklet 202 is saved to the collections 226 assigned to it.

While the invention is described through the above exemplary embodiments, it will be understood by those of ordinary skill in the art, both now and in the future, that modification to and variations of the illustrated embodiments may be made without departing from the inventive concepts herein disclosed.

We claim:

1. A method of collecting data contained within web resources in a uniquely identifiable bookmarklet system, the method comprising:
- receiving a request from the user to generate a uniquely identifiable bookmarklet that is associated with one or more collections within an information repository;
- generating the said uniquely identifiable bookmarklet that comprises: generating a bookmarklet identifying marker that identifies the said uniquely identifiable bookmarklet within the said uniquely identifiable bookmarklet system, wherein the bookmarklet identifying marker associates with the said collections in the said information repository; and generating a URL having program code that is executable in the users web browser program that performs an operation within the context of the document object model ("DOM") of the currently loaded Web page, wherein the operation results in the users Web browser program sending a request to a bookmarklet processor, wherein the request contains the said bookmarklet identifying marker;
- storing the said bookmarklet identifying marker in a bookmarklet manager;
- receiving a request from the user, responsive to the user executing the said program code within the context of the DOM of a currently loaded Web page;
- authenticating the said request from the user by comparing the said bookmarklet identifying marker contained in the said request with the list of bookmarklet identifying markers stored in the said bookmarklet manager and preventing access to the said request if the said bookmarklet identifying marker contained in the said request does not match any of the bookmarklet identifying markers stored in the said bookmarklet manager;
- authorizing the said request from the user that comprises: determining the authorization controls applied to the said bookmarklet identifying marker; and preventing access to the said request if the conditions of any one of the said authorization controls are not met;
- permitting the user access to retrieve additional resources, wherein the additional resources having program code to aid the user in extracting data from the said DOM of the currently loaded Web page and submitting data;
- receiving data submitted by the user; and
- storing the submitted data to the said collections within the said information repository associated with the said uniquely identifiable bookmarklet.

2. A method of authenticating a web request to process data contained within web resources in a uniquely identifiable bookmarklet system, a method comprising:
- generating a uniquely identifiable bookmarklet that comprises: generating a bookmarklet identifying marker that is sufficient to uniquely identify the said uniquely identifiable bookmarklet within the said uniquely identifiable bookmarklet system, wherein the bookmarklet identifying marker is associated with a data model contained in the said uniquely identifiable bookmarklet system; and generating a URL having program code that is executable in the users web browser program that performs an operation within the context of the document object model ("DOM") of the currently loaded Web page, wherein the operation results in the users Web browser program sending a request to a bookmarklet processor, wherein the request contains the said bookmarklet identifying marker;
- storing the said bookmarklet identifying marker, or variation thereof, in a bookmarklet manager as a permitted value;
- receiving a request to the said bookmarklet processor, responsive to a user executing the said program code within the context of the DOM of a currently loaded Web page; and
- authenticating the said request that comprises: comparing the said bookmarklet identifying marker with a list of the said permitted values in the said bookmarklet manager; and preventing access to the said request if the said bookmarklet identifying marker does not match any of the said permitted values stored in the said bookmarklet manager.

3. The method of claim 2, wherein said program code sends a request containing the said bookmarklet identifying marker to the said bookmarklet processor may in place of the said bookmarklet identifying marker send a variation thereof resulting from a computation by the said program code, wherein the computation by the said program code performs a calculation using the said bookmarklet identifying marker as one of its parameters.

4. The method of claim 2, wherein authenticating the said request may compare additional data contained in the said request in conjunction with the said bookmarklet identifying marker contained in the same said request, wherein the additional data may include any data that the said program code can access when executing in the users web browser program.

* * * * *